W. BERNDT.
ANTISKID CHAIN FOR VEHICLE WHEELS.
APPLICATION FILED MAR. 25, 1919.

1,316,873.

Patented Sept. 23, 1919.
2 SHEETS—SHEET 1.

WITNESS
J. P. Britt

INVENTOR
Wilhelm Berndt
BY
Young & Young
ATTORNEYS

W. BERNDT.
ANTISKID CHAIN FOR VEHICLE WHEELS.
APPLICATION FILED MAR. 25, 1919.
1,316,873.
Patented Sept. 23, 1919.
2 SHEETS—SHEET 2.
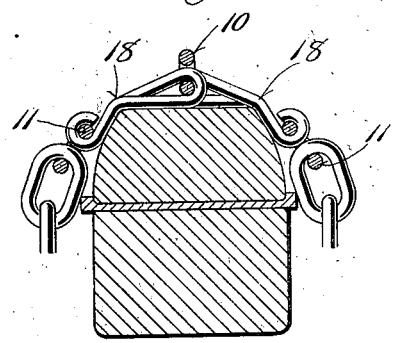
Fig. 3.
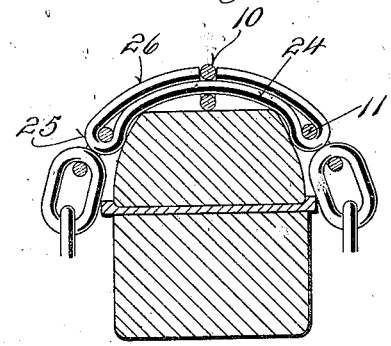
Fig. 4.
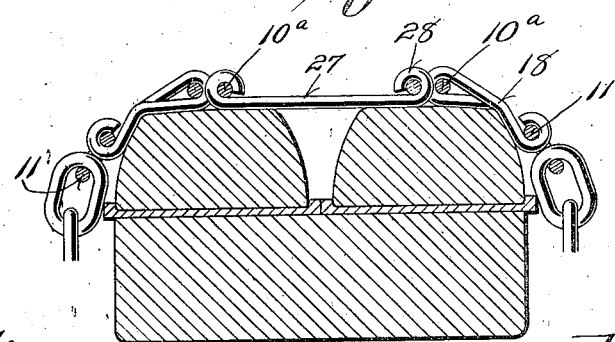
Fig. 5.
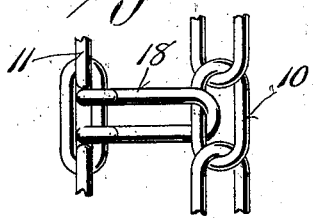
Fig. 6.
Fig. 7.
WITNESS
T. F. Britt
INVENTOR
Wilhelm Berndt
BY
Young & Young
ATTORNEYS

UNITED STATES PATENT OFFICE.

WILHELM BERNDT, OF HOWARDS GROVE, WISCONSIN.

ANTISKID-CHAIN FOR VEHICLE-WHEELS.

1,316,873.　　　　　Specification of Letters Patent.　　Patented Sept. 23, 1919.

Application filed March 25, 1919. Serial No. 284,944.

*To all whom it may concern:*

Be it known that I, WILHELM BERNDT, a citizen of the United States, and resident of Howards Grove, in the county of Sheboygan and State of Wisconsin, have invented certain new and useful Improvements in Antiskid-Chains for Vehicle-Wheels; and I do hereby declare that the following is a full, clear, and exact description thereof.

My invention relates to new and useful improvements in anti-skid devices more particularly of that type comprising chain lengths adapted to be mounted on the tire portion of an automobile or other vehicle wheel and provided with means whereby they are detachably held in place to effect a most efficient anti-skid action.

It is in general my object to simplify and otherwise improve the structure, and to increase the efficiency of devices of this character, as well as to increase the degree of readiness with which such devices may be securely mounted on the vehicle wheel or removed therefrom.

A further object desired is the provision of a device of this character including a central chain and side chains for disposition respectively at the central and side portions of a tire, of means for connecting such chains which effects a gripping function upon travel of the wheel, and which serves to hold the chains in properly spaced relation.

A further object in this connection resides in the provision of such a connecting means which may be formed of a single length of metal.

A still further and important object resides in the provision of an arrangement for connecting spaced portions of the tire chains which, after the device has been placed about a wheel may be drawn together to effect a positive securement of these chains in snug relation to the tire.

With these and other object in view, which will be apparent as the description proceeds, my invention resides in the novel features of construction, combination and arrangement of parts as hereinafter described and defined by the appended claims, it being understood that changes in the precise embodiment might be made by those skilled in the art, without departing from the spirit of the invention.

In the accompanying drawings:

Fig. 3 is a transverse sectional view through the tire of the wheel and adjacent portions of my device.

Fig. 4 is a similar view showing a modified structure.

Fig. 5 is a similar view showing a further modification of structure adapted for wheels of relatively great width.

Fig. 6 is a detail plan view of means which I employ for connecting the chains together.

Fig. 7 is a detail view of means which I employ for connecting together the ends of each chain stretch.

Figure 1:
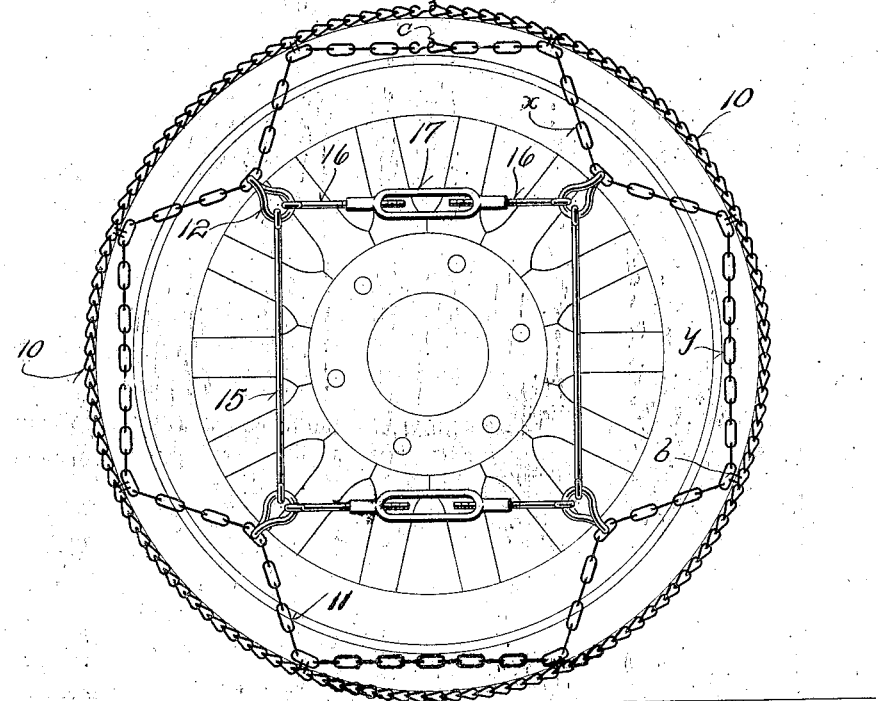
Figure 1 is a side elevational view of my improved anti-skid device applied to the wheel, looking toward the outer side of the wheel.
Figure 2:
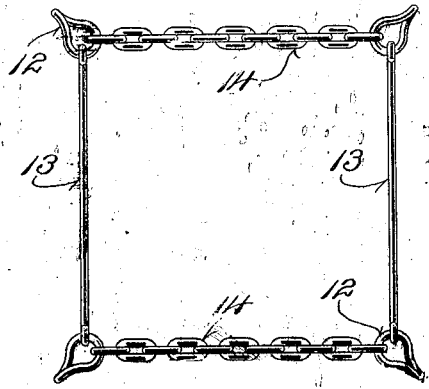
Fig. 2 is an elevational view of the means employed for connecting the chain stretches at the inner side of the wheel.

Referring now more particularly to the drawings, I provide a central chain 10 which is adapted to extend circumferentially about the tread surface of a tire and which is formed of links having any desired nature to effect an efficient gripping anti-skid function, the ends of the chain being adapted for detachable connection at $a$ in Fig. 1. Side chains 11 are associated with these central chains, being connected therewith at spaced intervals as indicated at $b$ in Fig. 1, the ends of each side chain being detachably connected as indicated at $c$. The connections $b$ thus divide the side chains into sections, each of the sections being longer than the corresponding section of the central chain 10, and alternate sections $x$ of the side chain lengths are relatively longer than the other sections $y$, the sections $y$ being of such relative lengths as to fit snugly against the sides of the tire when the device is mounted thereon, while the sections $x$ may extend inwardly of the tire. For securing this chain structure snugly to a wheel when disposed thereabout, connecting loops 12 are secured to the central portion of each side chain section $x$, said loops being four in number in the present instance and having their end portions twisted to lie in right angular relation. At the inner side of the wheel, these loops are all connected together, such connection in the present instance comprising the link bars 13 having their ends in hook engagement with adjacent loops 12, a chain section 14 extending between the otherwise unconnected loops, thus defining a polygonal figure surrounding the axle. Similar link bars 15 connect adjacent loops 12 at the outer side of the wheel, the mutual connections of the link bars at the outer side of the wheel being accomplished by links 16 connected with the turnbuckle 17.

Thus, when the device has been placed about the wheel, all the parts may be tightened to snugly fit against the tire by tightening one or both of the turnbuckles 12, and in this connection it is noted that any contractile means may be employed for effecting this snug engagement and contractile springs may be employed if desired. By forming the said chain sections $x$ of any relatively great length and thus disposing the connecting loops 12 inwardly of the tire, said loops are protected from breakage which might otherwise occur due to projections in the road. Also, it will be noted that the specified relation of the same stretches procures a most efficient anti-skid and gripping function by reason of the convergent relations of the adjacent portions of the central and side chains. As shown particularly in Figs. 3 and 6, the central and side chains are connected at points $b$ by tie loops 18 each formed of a single length of metal having its intermediate portion bent about a side of one of the lengths of the central chain 10 and having its end portions bent to form terminal eyes 20 receiving a side of the adjacent length of a side chain 11, there being two of these connecting loops thus provided at each connecting point $b$, and these connecting loops obviously perform an efficient gripping action upon their engagement with the ground.

I preferably connect the ends of each chain together in the manner shown in Fig. 7, wherein there is provided a closed loop 21 connected by a swivel eye 22 with one end of the chain, and engaged by the outturned ends of a coupling member formed of a single length of wire 23 having its intermediate portion bent to form an eye receiving the other end of the chain, said outturned ends being spaced apart a distance greater than the width of the loop 21 and being interlocked with the loop by inserting them therein in laterally turned position.

To meet differing conditions of use of my device, I may employ a modified means for connecting the central and side chain as shown in Fig. 4, wherein there is provided a connecting member formed of a single length of metal having its intermediate portion adapted to extend transversely across the tire at 24 and having its end portions bent to form eyes 25 at their junctures with the intermediate portion which receive adjacent links of the side chains 11, the end portions 26 being extended reversely along the intermediate portion 24 and terminating in abutting relation with the side of an adjacent link of the chain 10, which is disposed on said intermediate portion 24, this abutting relation of the end portions 26 of the connecting member serving to hold the central chain equally spaced from the side chains and thus maintain said central chain at the center of the tire tread.

For use on wide wheels, I may employ the modified structure shown in Fig. 5 wherein there are provided a pair of intermediate chains $10^a$ extending circumferentially about the tread, said chains being connected at the proper intervals with the heretofore described side chains 11 by the heretofore described connecting loops 18. Adjacent these loops 18 the chains $10^a$ are connected together by link rods 27 having their ends bent to form terminal eyes 28 engaged with the chain links. It will be understood that to meet other conditions of use, further changes or modifications to the structure may be resorted to within the scope of the appended claims.

What is claimed is:

1. A device of the class described comprising a central means for gripping, a pair of side chains each connected at spaced intervals with said central means for gripping whereby to divide said side chains into sections, and members adapted to extend across each side of a wheel and connected with intermediate portions of said side chain sections.

2. A device of the class described comprising a central means for gripping, a pair of side chains each connected at spaced intervals with said central means for gripping whereby to divide said side chains into sections, alternate sections of the side chains being longer than the other sections, and members adapted to extend transversely across the side of a wheel and connected with the intermediate portions of the said longer sections of the side chains.

3. A device of the class described comprising a central means for gripping, a pair of side chains each connected at spaced intervals with said central means for gripping whereby to divide said side chains into sections, and members adapted to extend across each side of a wheel and connected with intermediate portions of said side chain sections, one of said members being contractile whereby to draw the device against the wheel.

In testimony that I claim the foregoing I have hereunto set my hand at Milwaukee, in the county of Milwaukee and State of Wisconsin.

WILHELM BERNDT.